United States Patent
Boeck et al.

(10) Patent No.: US 9,767,055 B2
(45) Date of Patent: Sep. 19, 2017

(54) SENSOR TRANSMISSION DEVICE AND METHOD FOR TRANSMITTING PAYLOAD DATA FROM MULTIPLE SENSORS TO A BUS CONTROL DEVICE FOR A VEHICLE

(71) Applicants: Heiko Boeck, Rutesheim (DE); Michael Helmle, Esslingen (DE)

(72) Inventors: Heiko Boeck, Rutesheim (DE); Michael Helmle, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 510 days.

(21) Appl. No.: 14/362,333

(22) PCT Filed: Nov. 13, 2012

(86) PCT No.: PCT/EP2012/072474
§ 371 (c)(1),
(2) Date: Jun. 2, 2014

(87) PCT Pub. No.: WO2013/079315
PCT Pub. Date: Jun. 6, 2013

(65) Prior Publication Data
US 2014/0337550 A1  Nov. 13, 2014

(30) Foreign Application Priority Data
Dec. 1, 2011  (DE) ........................ 10 2011 087 509

(51) Int. Cl.
G06F 13/36  (2006.01)
G06F 13/42  (2006.01)
H04L 12/40  (2006.01)

(52) U.S. Cl.
CPC .......... *G06F 13/36* (2013.01); *G06F 13/4295* (2013.01); *H04L 12/40013* (2013.01); *H04L 12/40143* (2013.01)

(58) Field of Classification Search
CPC . H04L 9/00; H04L 29/06; H04L 69/06; H04L 69/22; G06F 3/00
See application file for complete search history.

(56) References Cited

U.S. PATENT DOCUMENTS 6,490,264 B1 * 12/2002 Suzuki ............... H04Q 11/0478
370/338
6,741,561 B1 * 5/2004 Lee ......................... H04L 47/10
370/230
(Continued)

FOREIGN PATENT DOCUMENTS

CN  101283338 A   10/2008
DE  102009027201   3/2011
(Continued)

OTHER PUBLICATIONS

Lin Consortium: "Lin Specification Package. Revision 2.0", Internet Citation, Sep. 23, 2003, Seiten, 125 pages, XP007910142.
(Continued)

*Primary Examiner* — Farley Abad
(74) *Attorney, Agent, or Firm* — Norton Rose Fulbright US LLP; Gerard Messina (57) ABSTRACT

A method is described for assigning payload data from a bus data packet to different sensor transmission devices, a bus control device being connected to a data bus of a vehicle designed for the simultaneous transmission of bus data packets (100) between multiple sensor transmission devices and the bus control device. The bus data packets include at least one signaling field and a payload data field having at least two payload data blocks. The method includes a step of reading in a bus data packet and a step of determining an assignment rule based on an action list. The action list includes multiple combinations in each case of one of
(Continued)

multiple possible operating states for each sensor transmission device which uses the data bus.

16 Claims, 3 Drawing Sheets

(56) References Cited

U.S. PATENT DOCUMENTS

| | | |
|---|---|---|
| 7,685,325 B2 | 3/2010 | Batchelor et al. |
| 7,966,456 B2 | 6/2011 | Trika et al. |
| 2003/0070019 A1 | 4/2003 | Dalakuras et al. |
| 2009/0089508 A1 | 4/2009 | Trika et al. |
| 2009/0177812 A1* | 7/2009 | Batchelor ........... G06F 13/4217 710/60 |
| 2010/0332706 A1 | 12/2010 | Hering et al. |

FOREIGN PATENT DOCUMENTS

| | | |
|---|---|---|
| EP | 1298849 | 4/2003 |
| EP | 1439670 | 7/2004 |
| JP | 2005513959 A | 5/2005 |

OTHER PUBLICATIONS

International Search Report for PCT/EP2012/072474, issued on Jan. 22, 2013.
Lin Consortium: "LIN Specification Package. Revision 2.0", Internet Citation, Sep. 23, 2003, Seiten, pp. 125, XP007910142.

* cited by examiner

SENSOR TRANSMISSION DEVICE AND METHOD FOR TRANSMITTING PAYLOAD DATA FROM MULTIPLE SENSORS TO A BUS CONTROL DEVICE FOR A VEHICLE

FIELD OF THE INVENTION

The present invention relates to a sensor transmission device, to a method for transmitting payload data from multiple sensors to a bus control device for a vehicle, and to a corresponding computer program product as recited in the main claims.

BACKGROUND INFORMATION

Instead of proprietary point-to-point connections between sensors and central evaluation units, "bus approaches" are being increasingly used in vehicles. The UN (Local Interconnect Network) bus is typically used in vehicles for this purpose as a standardized and cost-optimized bus system.

With the standard LIN protocol, a user sends its data in a dedicated frame in each case. As a result of the control data which are required for a frame, the net data transmission rate drastically worsens when a single user transmits only a small amount of data. According to the related art (LIN specification), the LIN protocol provides for each user to transmit its data with the aid of one or multiple dedicated frames, identified by a frame ID.

German Published Patent Appln. No. 10 2009 027 201 describes a method according to which multiple users share a frame, with the goal of reducing the total required control data. The position to which each user writes its data within the shared frame is established by its clear identifier. The positions of the data are thus statically established. All sensors must send for a valid frame to be created. The protocol is optimized for the case in which all users have new data to be sent in each cycle. The net data rate is then the highest. However, the net data rate decreases when individual users have no new data to be sent in one cycle. They must then send "empty bytes," whereby bandwidth is unnecessarily occupied or the cycle time is unnecessarily long. The approach described in the above-mentioned publication is also referred to as "VLINC" and will also be described by this designation hereafter in the description.

SUMMARY

Against this background, the present invention introduces a method for assigning payload data from a bus data packet to different sensor transmission devices, a bus control device which uses this method, a method for transmitting payload data from multiple sensors to a bus control device for a vehicle, a sensor transmission device which uses this method, and finally a corresponding computer program product as recited in the main claims. Advantageous embodiments are derived from the particular subclaims and the following description.

The present invention is based on the finding that the data format of an existing data bus for transmitting payload data of multiple sensors to a central evaluation unit or bus control unit may be efficiently used or modified for assigning the data to be transmitted. There is no need for an entire bus data packet to be used for each sensor, but multiple sensors or their transmission units may be interconnected to form a "virtual unit." The payload data originating from multiple sensors thus may be integrated into the payload data field of a single bus data packet. In this way the signaling complexity is reduced, and thus the signal overhead, since now a larger amount of payload data may be transmitted with the aid of a bus data packet. To be able to carry out such a data transmission from multiple sensors to the evaluation unit or to the bus control unit free of fault, predetermined signaling information or predetermined signaling data from a number of different signaling data should be situated in the signaling field of such a bus data packet, which indicate(s) to the sensor transmission devices that a bus data packet is now being transmitted via the data bus, which is evaluated by the bus control device in accordance with a predetermined assignment rule of the payload data blocks in the payload data field to the particular sensor transmission devices. Compared to known methods, the approach described here allows the bus data packets which are sent via the data bus to be shortened for the case that not all connected sensor transmission devices have to contribute payload data to each bus data packet. The lengths and positioning of the payload data blocks within the bus data packets are known to all devices connected to the data bus via an assignment rule.

The present invention creates a method for assigning payload data from a bus data packet to different sensor transmission devices, a bus control device being connected to a data bus of a vehicle designed for the simultaneous transmission of bus data packets between multiple sensor transmission devices and the bus control device, the bus data packets including at least one signaling field and a payload data field having at least two payload data blocks, and the method including the following steps:

reading in a bus data packet;

determining an assignment rule based on an action list, the action list containing multiple combinations in each case of one of multiple possible operating states for each sensor transmission device which uses the data bus, the assignment rule representing a relation between a length of the payload data field and the instantaneous operating state of each of the sensor transmission devices; and interpreting the payload data of the bus data packet and assigning the read-out payload data to the different sensor transmission devices, the step of interpreting and assigning taking into consideration that the payload data field has different lengths for different combinations of the operating states of the sensor transmission devices in accordance with the assignment rule the bus data packet.

The vehicle may be a motor vehicle, for example a passenger car, a truck or any other commercial vehicle. A sensor transmission device may be understood to mean a device which picks up sensor signals from a sensor and forwards these to a data bus. The sensor signals represent a physical quantity detected by the sensor. The sensor transmission device may, for example, extract relevant payload data from the sensor signals and make the payload data available on the data bus in accordance with additional rules. The data bus may be a LIN bus, for example, another data bus also being conceivable. For example, bus data packets may be transmitted via the data bus in accordance with an established definition or specification. The data bus may be designed as a serial bus, for example. The bus data packets may be composed of a signaling field, also referred to as "header," "frame ID" or signaling ID, a payload data field and further optional features. An action list may be understood to mean a list which includes multiple combinations in each case of one of multiple operating modes or states for all sensor transmission devices and for the bus control device. All sensor transmission devices in the network are thus able to determine which sensor transmission devices will send something and may accordingly determine the position for payload data block in the payload data field. The determination of the positions for the individual payload data blocks in a bus data packet may be understood as an assignment rule.

The present invention also creates a method for transmitting payload data from a sensor transmission device to a bus control device using a data bus designed for the simultaneous transmission of bus data packets between multiple sensor transmission devices and the bus control device, the bus data packets including at least one signaling field and a payload data field having at least one payload data block, and the method including the following steps:

obtaining payload data from a sensor, the payload data representing a physical quantity measured by the sensor;

ascertaining an assignment rule based on an action list, the action list containing multiple combinations in each case of one of multiple possible operating states for each sensor transmission device which uses the data bus, and one of multiple different lengths and/or one of multiple different positions of the payload data block in the payload data field being ascertained as a function of the assignment rule and an instantaneous operating state of the sensor transmission device; and receiving predetermined signaling data in the signaling field of the bus data packet and, in response thereto, positioning at least a portion of the received payload data in the at least one payload data block specified by the assignment rule for the sensor transmission device.

In addition, a sensor transmission device or bus control device is presently introduced, which may be designed to carry out or implement the steps of the above-mentioned methods or a variant thereof in corresponding devices. The object of the present invention may also be achieved quickly and efficiently by this embodiment variant of the present invention in the form of a sensor transmission device or a bus control device.

A sensor transmission device or a bus control device may presently be understood to mean an electrical device which processes sensor signals and outputs control signals as a function thereof. The sensor transmission device and/or the bus control device may have at least one interface which may be designed as hardware and/or software. In the case of a hardware design, the interfaces may, for example, be part of a so-called system ASIC which includes a wide variety of functions of a control unit. However, it is also possible for the interfaces to be separate integrated circuits, or to be at least partially composed of discrete components. In the case of a software design, the interfaces may be software modules which are present on a microcontroller, for example, in addition to other software modules.

In addition, a computer program product is advantageous, having program code which may be stored on a machine-readable medium such as a semiconductor memory, a hard disk memory or an optical memory, and which is used to carry out the method according to one of the specific embodiments described above, if the program is executed on a computer or the sensor transmission device or the bus control device.

The present invention offers the advantage that the net data transmission rate in a network having multiple sensor transmission devices, which each send only small amounts of data and do not have data to send in each cycle, is improved, i.e., increased. If only small amounts of data are to be sent by each sensor transmission device, the control data reach a high proportion of the total data rate. This problem was already addressed in previously known approaches, however a large number of empty bytes or previously sent data were supposed to be transmitted in a system having sensor transmission units which do not have data to send in each cycle to generate a valid bus data packet. This is where the method presented above comes in and increases the net data transmission rate since it is not necessary to transmit empty bytes.

In one favorable specific embodiment of the present invention, the positioning of multiple message blocks in a message field may be ascertained in the step of determining or in the step of ascertaining, having knowledge of the instantaneous operating states of all sensor transmission devices which use the data bus. For example, if an operating state of a sensor transmission unit has a higher priority for the bus control unit, the relevant payload data block could be situated further ahead in a bus data packet. Or the payload data blocks may be situated in an imaginary ascending order, the sensor transmission devices which presently have no data to send being disregarded.

In one further specific embodiment, the action list may also be sent and/or received and/or updated in a step of initializing.

This is advantageous if it is possible to replace the action list during the operation of the bus control device or a higher-level system to respond to a new operating situation. It is thus also possible to save memory for the action list since, for example, only the instantaneously relevant portion of a larger action list should be available to all bus users at a moment.

Moreover, according to one specific embodiment of the present invention, the assignment rule may be determined in the step of determining or ascertaining based on an action list, using the signaling data written by the bus control device into the signaling field of a bus data packet. It may be advantageous that no additional selection command is required, which would lower the net data transmission rate.

In one specific embodiment of the present invention, an action which is selected from the action list is advantageously carried out in the sensor transmission device in the step of ascertaining based on the signaling data written by the bus control device into the signaling field of a bus data packet. This dispenses with a selection command to be sent additionally and ultimately increases the net data transmission rate.

According to one further specific embodiment of the present invention, a selection command may be sent from the bus control device to a first and an at least second sensor transmission device in a step of sending, the selection command causing a first action selected from the action list to be carried out in the first sensor transmission device and a second action selected from the action list to be carried out in the at least second sensor transmission device. Multiple or all sensor transmission devices may thus be polled using one selection command, or the operating states of multiple or all sensor transmission devices may be influenced.

DETAILED DESCRIPTION

In the following description of preferred exemplary embodiments of the present invention, identical or similar reference numerals are used for similarly acting elements shown in the different figures, and a repeated description of these elements is dispensed with.

The exemplary embodiments described hereafter are explained using a LIN bus as the data bus, other bus systems also being usable as the data bus in vehicles in accordance with the approach according to the present invention.

Figure 1A:
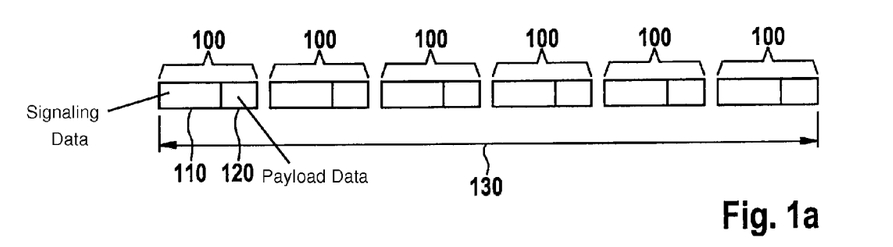
FIGS. 1*a*-*d* show illustrations of a composition of data packets in a conventional data transmission in relation to the composition of a data packet on the data bus according to the VLINC protocol and according to a first exemplary embodiment of the present invention.

The illustrations in FIGS. 1a, 1b, 1c and 1d show a composition of data packets in a conventional data transmission in relation to the composition of a data packet on the data bus according to the VLINC protocol and according to a first exemplary embodiment of the present invention. FIG. 1a shows a chronological sequencing of bus data packets 100, which are transmitted via a data bus, in a conventional data transmission according to the LIN protocol. In a first exemplary embodiment it is assumed that each sensor wants to transmit 1 byte, i.e., 8 bits, six sensors being connected to the LIN bus. A single bus data packet 100 is to be provided for each of the sensors. A bus data packet 100 is composed of signaling data 110, also referred to as frame ID 110, and a payload data block 120. A transmission time 130 elapses until all six bus data packets 100 are transmitted according to the conventional approach.

In a first part (signaling), signaling data 110 which are individually predetermined for a sensor are transmitted, which are sent from a master or a bus control device to the data bus and trigger a function in the particular addressed sensor or the particular addressed sensor transmission device. This triggered function may consist of making the payload data of the particular sensor unit available after the corresponding signaling data have been received. These payload data represent, for example, a distance of the vehicle from an object outside the vehicle measured by ultrasound or another physical quantity. In one payload data field adjoining signaling field 110, the payload data supplied by the sensor may be inserted into a payload data block 120 and sent from the sensor transmission device via the data bus to the bus control device. The payload data field may include multiple payload data blocks 120.

FIG. 1a shows, by way of example, a transmission according to the LIN protocol. Each user sends its data in a separate frame. The ratio of payload data to control data becomes significantly worse with a low amount of payload data. For example, if each user in a network made of six users wants to send one byte, according to the LIN standard protocol six individual frames are to be sent, each having only a single byte. This would mean a transmission time of 23.64 ms (6*3.94 ms).

FIG. 1 shows a situation according to the standard LIN protocol in which only two users or sensors send data in one cycle. Two bus data packets 100 are sent, a first bus data packet 100 made of signaling field data 110 and a payload data block 120.1 transmitting payload data of a first sensor, and a second bus data packet 100 made of signaling field data 110 and a payload data block 120.1 transmitting payload data of a second sensor. A transmission time 132 elapses until the two bus data packets are transmitted according to the conventional approach.

Figure 1B:
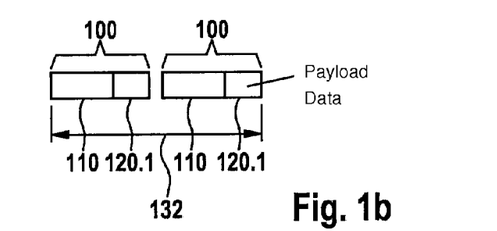

If only two users have data to send in one cycle, these may also be individually polled using the standard LIN protocol. When the example shown in FIG. 1a is continued, a transmission time 132 of 7.88 ms results for the transmission of payload data from two sensors.

Figure 1C:
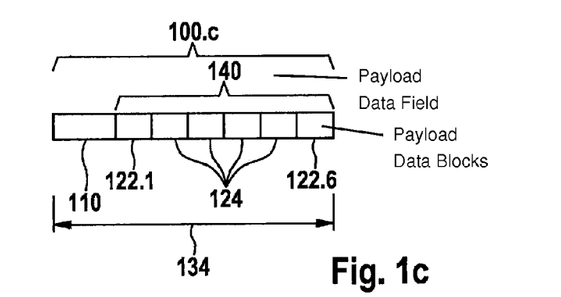

FIG. 1c shows an extension of the standard LIN protocol. A bus data packet 100.c is composed of signaling data 110 and a payload data field 140, payload data field 140 being composed of multiple payload data blocks 122.1, 122.6 and 124. A transmission time 134 elapses for the transmission of a bus data packet 100.c according to FIG. 1c. According to the standard LIN protocol, a bus data packet 100 includes only payload data of one sensor. An extension according to the VLINC protocol allows payload data of multiple sensors to be combined in one payload data field. FIG. 1c shows the transmission of payload data of six sensors, analogously to FIG. 1a. If, analogously to FIG. 1b, only two sensors have payload data to be transmitted, the other sensors should send empty bytes 124 instead of payload data. The payload data field 140 accordingly includes two payload data blocks 122.1 and 122.6 filled with payload data and payload data blocks 124 filled with empty bytes.

In the VLINC protocol, all six users write their bytes to a shared frame. As a result, the transmission time is only 7.58 ms. This method presupposes that all users have a clear ID. The positions of the data bytes in the shared frame are determined based on this ID. The positions of the data are thus statically established.

FIG. 1c shows a positioning of the data according to the VLINC protocol. All six users are to send one data packet (e.g., one byte), i.e., one payload data block 122.1, 122.6, 124. If they do not have any new data to transmit, empty bytes 124 are transmitted instead.

Figure 1D:
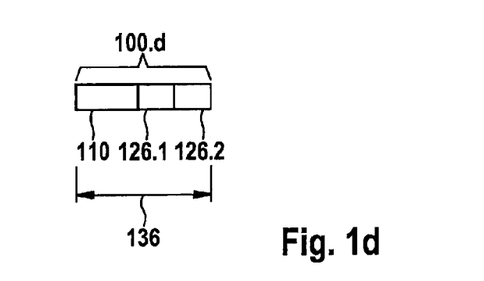

FIG. 1d shows a transmission of payload data according to the present invention via a data bus, in this example according to the present invention six sensors being connected to the data bus, presently only two sensors having payload data to be transmitted. A bus data packet 100 is composed of signaling data 110 and two payload data blocks 126.1 and 126.2, payload data block 126.1 including payload data of a first sensor and payload data block 126.2 including payload data of a second sensor. A transmission time 136 elapses for the transmission of bus data packet 100.d.

A first variant of the present invention presupposes that all users know when which users want to send data. With the present invention, all users are sent a global action list. As a result, each user not only has the information of its own actions, but also about that of all other users in the network. All users thus known when which user wants to send something and accordingly may dynamically determine their positions of the data within the frame or their payload lengths. Frame ID 110 is not of importance for this procedure. This method in particular also still works when the global action list is updated during operation.

In one exemplary embodiment, it is assumed that six sensors are connected to one data bus and that each of the sensors has payload data having a length of one byte to be transmitted. It is assumed that only two of the six users want to transmit one byte, and so a transmission time of 4.67 ms may be achieved with this present invention (instead of 7.58 ms according to the VLINC protocol according to FIG. 1c, or instead of 7.88 ms according to the standard LIN protocol according to FIG. 1b). An additional variant provides that the users know based on frame ID 110 to which byte position they should write their data. The users thus should not be informed about the actions of the other users.

Assuming that in one cycle in fact only two out of six users have data to send, these would be polled in each case with a frame, as shown in FIG. 1b, according to the standard LIN protocol. With the standard VLINC protocol, the frames would be composed as shown in FIG. 1c. A dynamic positioning of the data in accordance with this variant of the present invention is shown in FIG. 1d.

FIG. 1d shows a positioning of the data according to the present invention. Only the users which in fact have data to be transmitted are still sending. To ensure that user 6 does not send its data to position 6 (as in FIG. 1c), but to position 2, the user may calculate this from the information of the action list or determine this based on frame ID 110.

Verifiability takes place with the aid of an analysis on the physical layer (e.g., with the aid of an oscilloscope). In the VLINC protocol, it is noticeable that all users contribute data to a frame in a static manner. In the method according to the present invention, it is apparent on the physical layer that the frames are composed dynamically. Thus, not all users send all the time.

Figure 2:
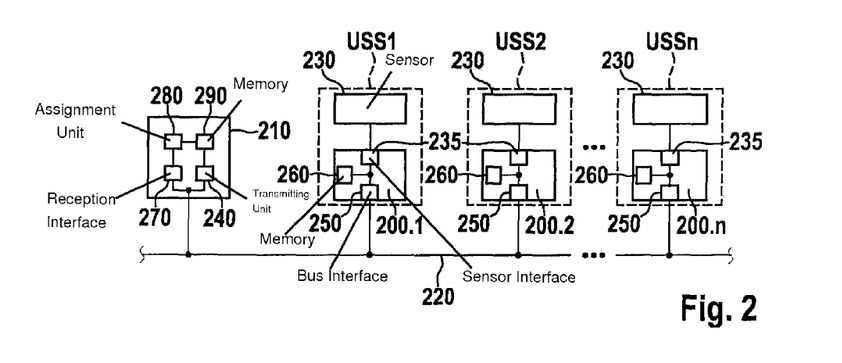
FIG. 2 shows a block diagram of a data transmission system using one exemplary embodiment of the sensor transmission device according to the present invention and one exemplary embodiment of the bus control device according to the present invention.

FIG. 2 shows a block diagram of a connection of exemplary embodiments of sensor transmission devices 200.1, 200.2, . . . 200.*n* to one exemplary embodiment of a bus control device 210 via a data bus 220. Each sensor transmission device 200.1, 200.2, . . . , 200.*n* may be connected to a sensor 230 to form a sensor unit USS1, USS2, USSn, sensors 230 of sensor transmission device 200 making data available via a sensor interface 235. These data represent a physical quantity. For example, the physical quantity may be an ultrasound-based distance signal to an object outside the vehicle if sensor 230 is used as a parking assistance system. Bus control device 210 may be designed to control the data transmission via data bus 220 and to evaluate the payload data from the payload data field of a bus data packet 100.

Bus control device 210 has a transmitting unit 240, which situates predetermined signaling data in the signaling field of a bus data packet 100 at a certain time and transmits these signaling data via data bus 220. These signaling data may be read out via a bus interface 250 in each sensor transmission device 200 by data bus 220 and interpreted. If sensor transmission units 200.1, 200.2, . . . , 200.*n* detect the predetermined signaling data on data bus 220, which initializes a data transmission of payload data of sensors 230 of the different sensor units USS1, USS2, USSn, each of sensor transmission devices 200.1, 200.2, . . . , 200.*n* or the particular bus interface 250 may insert one byte of payload data into payload data block 135 of the payload data field of a bus data packet 100 which is reserved for the corresponding sensor transmission device 2001.1, 200.2, . . . , 200.*n*. The position at which the payload data of the particular sensor unit USS1, USS2, USSn may be inserted into payload data field 130 is stored for each of sensor transmission devices 200.1, 200.2, . . . , 200.*n* in a memory 260. Instead of direct information about the position in the payload data field, an action list may be stored in the memory in one exemplary embodiment, an assignment rule being determinable from the action list. Bus interface 250 of each sensor transmission device 200.1, 200.2, . . . , 200.*n* thus initially retrieves from assigned memory 260 the position information stored there, or determines an assignment rule from the action list stored in the memory, the position information being derived from the assignment rule, and inserts at least a portion of the payload data of the relevant sensor 230 into payload data block 135 defined by the position information. In this way a bus data packet 100 may be generated, which to bus control device 210 appears as if it originated from a single unit. Sensor units USS1, USS2, USSn are thus interconnected as a "virtual sensor." The payload data are evaluated in bus control device 210 in such a way that the payload data in the payload data blocks of the payload data field are read out via a reception interface 270 and interpreted in an assignment unit 280 in accordance with an assignment rule as belonging to the different sensor transmission units 200.1, 200.2, . . . , 200.*n*. The assignment rule, in which an exclusive reservation of payload data blocks of the payload data field for the transmission of the payload data of the different sensor transmission devices 200.1, 200.2, . . . , 200.*n* to bus control device 210 is stored, may be retrieved from a corresponding memory 290.

Due to the above-mentioned exemplary embodiment of the present invention, the individual sensor units or the sensor transmission devices are thus interconnected to form a dependent and controlled "virtual unit," i.e., a virtual "slave" or a "virtual device," which may be composed of up to 8 individual "slaves" (i.e., individual sensor units). Each "slave" may fill in one byte in an exactly defined location in each measuring data packet 100. This exactly defined location in the measuring data packet (payload data field) is defined with the aid of a sensor identification, which is stored in a memory in each sensor unit or each sensor transmission device 100.

The length of the sensor data field may be differently long for each measuring data packet 100, the length resulting from the assignment rule which was determined using an action list.

Figure 3:
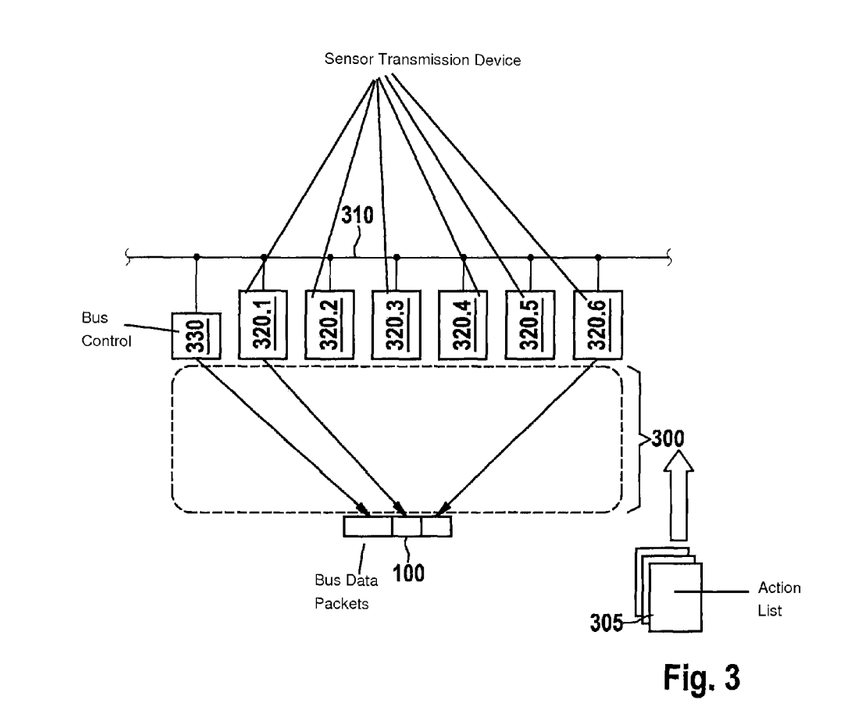
FIG. 3 shows a graphic representation of an assignment rule of an additional exemplary embodiment.

FIG. 3 shows a graphic representation of an assignment rule 300 of an additional exemplary embodiment according to the method according to the present invention. The assignment rule is created using an action list 305. Sensor transmission devices 320.1, 320.2, 320.3, 320.4, 320.5 and 320.6 as well as a bus control device 330 are connected to a data bus 310. Assignment rule 300 results from an action list 305 stored in a memory. In one exemplary embodiment, action list 305 may thus request data from sensor transmission device 320.1 and from sensor transmission device 320.6. In the selected example, sensor transmission devices 320.2, 320.3, 320.4 and 320.5 do not send any data. This results in an assignment rule 300, that the bus control device sends the frame ID or signaling data 110 for a bus data packet 100, and that in the adjoining payload data field the first payload data block includes payload data of sensor transmission device 320.1 and the second payload data block in the payload data field of bus data packet 100 includes payload data of sensor transmission device 320.6. Additional sensor transmission devices 320.2, 320.3, 320.4 and 320.5 do not send any data and do not occupy any payload data blocks in bus data packet 100.

The advantage of a shorter bus data packet 100 compared to the method shown in German Published Patent Appln. No. 102009027201 becomes clear in the exemplary embodiment of the method according to the present invention shown in FIG. 3, since it is not necessary to transmit empty bytes or, alternatively, it is not necessary to divide the two payload data blocks onto two bus data packets 100.

Figure 4:
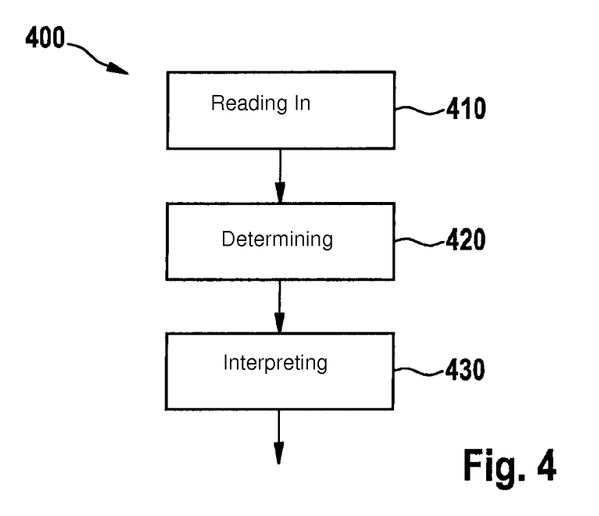
FIG. 4 shows a flow chart of one exemplary embodiment of the present invention as a method.

FIG. 4 shows a flow chart of a method 400 for transmitting payload data of multiple sensors to a bus control device for a vehicle according to one exemplary embodiment of the present invention. The method includes a step 410 of reading in, a step 420 of determining, and a step 430 of interpreting.

In one exemplary embodiment, step 420 of determining follows step 410 of reading in. Step 430 of interpreting follows step 420 of determining. In an additional exemplary embodiment of the present invention which is not shown here, step 410 of reading in and step 420 of determining are carried out in parallel and are followed by step 430 of interpreting. Step 430 of interpreting includes a substep of assigning.

A bus data packet is read in by the bus control device in step 410 of reading in. An assignment rule for the sensor transmission devices to the payload data blocks in the payload data field of the bus data packet is determined in step 420 of determining. For this purpose, the operating states for all sensor transmission devices are determined from an action list, the sensor transmission devices which have payload data to transmit are selected, and these sensor transmission devices are brought into a defined sequence; the payload data transmitting sensor transmission devices are assigned to the payload data blocks in the payload data field of a bus data packet. The length of the payload data field results from the assignment rule with the aid of the number of the payload data blocks. In step 430 of interpreting, the bus data packet read in in step 410 of reading in is interpreted in such a way that the payload data transmitted in the bus data blocks which represent a sensor signal are assigned to the sensor transmission devices. For example, the action list used in step 420 of determining may be available from the start or, alternatively, may be made available in a step of initializing, which is not shown. The step of initializing may receive the action list in the bus control device and simultaneously or alternatively make the action list available via the data bus to the sensor transmission devices. In an additional exemplary embodiment of the present invention which is not shown, the action list may be updated or replaced during ongoing operation.

Figure 5:
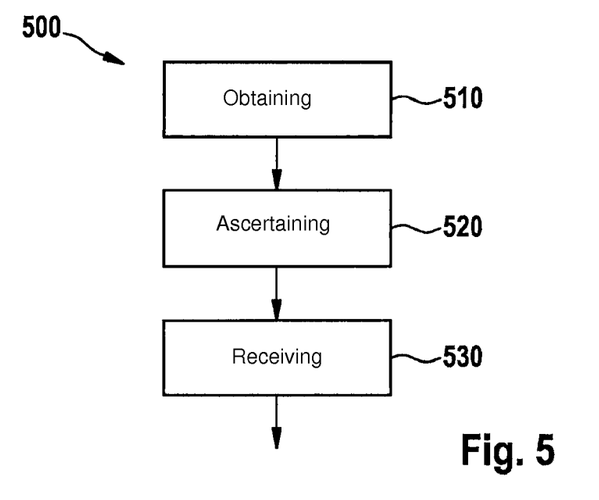
FIG. 5 shows a flow chart of an additional exemplary embodiment of the present invention as a method.

FIG. 5 shows a flow chart of a method 500 for transmitting payload data from multiple sensors to a bus control device for a vehicle according to one exemplary embodiment of the present invention. The method includes a step 510 of obtaining, a step 520 of ascertaining, and a step 530 of receiving. In one exemplary embodiment, step 520 of ascertaining follows step 510 of obtaining. Step 530 of receiving follows step 520 of ascertaining. In one additional exemplary embodiment of the present invention which is not shown here, step 510 of obtaining and step 520 of ascertaining are carried out in parallel and are followed by step 530 of receiving. Step 530 of receiving includes a substep of positioning.

In step 510 of obtaining, the sensor transmission device obtains payload data from a sensor, the payload data representing a variable measured by the sensor. In step 520 of ascertaining, an assignment rule is created using an action list. The action list predefines an operating state from multiple possible operating states for each sensor transmission device. The position information for the payload data block for the particular sensor transmission device is determined in step 520 of determining with the aid of the information in the action list. For this purpose, the operating states for all sensor transmission devices are determined from an action list, the sensor transmission devices which have payload data to transmit are selected, and these sensor transmission devices are brought into a defined sequence. In step 530 of receiving, predetermined signaling data in the signaling field of a bus data packet are received by the sensor transmission device and then the payload data of the sensor which were read in in step 510 of obtaining are positioned in the bus data packet in the payload data block ascertained in step 520. In one additional exemplary embodiment, the action selection and determination of the position information for the bus data block do not take place with the aid of an action list, but the assignment rule results directly from the signaling data in the signaling field. For example, the action list used in step 520 of ascertaining may be available from the start or, alternatively, may be made available in a step of initializing, which is not shown. The action list may be received in the sensor transmission device in the step of initializing. In one additional exemplary embodiment of the present invention which is not shown, the action list may be updated or replaced during ongoing operation. The selection of an action from the action list in step 520 of ascertaining may take place with the aid of a selection command sent via the data bus and simultaneously or alternatively via predetermined signaling data in the signaling field of a bus data packet.

The described exemplary embodiments shown in the figures are selected only by way of example. Different exemplary embodiments may be combined with each other completely or with respect to individual features. It is also possible to supplement one exemplary embodiment with features of another exemplary embodiment.

Moreover, method steps according to the present invention may be carried out repeatedly and in a different order than the one described.

If one exemplary embodiment includes an "and/or" linkage between a first feature and a second feature, this should be read in such a way that the exemplary embodiment according to one specific embodiment includes both the first feature and the second feature, and according to an additional specific embodiment includes either only the first feature or only the second feature.

What is claimed is:

1. A method performed by a bus control device for assigning payload data from a bus data packet to different sensor transmission devices, the bus control device being connected to a data bus of a vehicle designed for a simultaneous transmission of bus data packets between multiple sensor transmission devices and the bus control device, the method comprising:

reading in a bus data packet including at least one signaling field and a payload data field having at least two payload data blocks, wherein the payload data field is configured to have a variable number of total payload data blocks;

determining an assignment rule based on an action list, the action list containing multiple combinations in each case of one of multiple possible operating states for each sensor transmission device using the data bus, the assignment rule representing a relation between a number of total payload data blocks of the payload data field and an instantaneous operating state of each of the sensor transmission devices; and interpreting a payload data of the bus data packet and assigning a read-out payload data to the different sensor transmission devices, taking into consideration that the payload data field has a different number of total payload data blocks for different combinations of the operating states of the sensor transmission devices in accordance with the assignment rule.

2. A method performed by a bus control device for transmitting payload data from a sensor transmission device to the bus control device using a data bus designed for a simultaneous transmission of bus data packets between multiple sensor transmission devices and the bus control device, the bus data packets including at least one signaling field and a payload data field having at least one payload data block, the method comprising:

obtaining payload data from a sensor, the payload data representing a physical quantity measured by the sensor;

ascertaining an assignment rule based on an action list, the action list containing multiple combinations in each case of one of multiple possible operating states for each sensor transmission device which uses the data bus, wherein the assignment rule represents a relation between a number of total payload data blocks of the payload data field and an instantaneous operating state of each of the sensor transmission devices;

ascertaining at least one of multiple different lengths and multiple different positions of the payload data block in the payload data field as a function of the assignment rule and the instantaneous operating state of the sensor transmission device, wherein the payload data field is configured to have a variable number of total payload data blocks; and receiving predetermined signaling data in the signaling field of the bus data packet and, in response thereto, positioning at least a portion of the received payload data in the at least one payload data block specified by the assignment rule for the sensor transmission device.

3. The method as recited in claim 2, wherein the positioning of multiple payload data blocks in one payload data field is ascertained based on the assignment rule and knowledge of the instantaneous operating states of all sensor transmission devices which use the data bus.

4. The method as recited in claim 1, wherein the action list is at least one of sent, received, and updated in a step of initializing.

5. The method as recited in claim 2, wherein the action list is at least one of sent, received, and updated in a step of initializing.

6. The method as recited in claim 1, wherein the assignment rule is determined in the step of determining based on the action list, using signaling data written by the bus control device into the signaling field of a bus data packet.

7. The method as recited in claim 2, wherein the assignment rule is ascertained in the step of ascertaining based on the action list, using the signaling data written by the bus control device into the signaling field of a bus data packet.

8. The method as recited in claim 2, wherein an action selected from the action list is carried out in the sensor transmission device in the step of ascertaining the assignment rule based on the signaling data written by the bus control device into the signaling field of a bus data packet.

9. The method as recited in claim 1, further comprising:
sending a selection command from the bus control device to a first and an at least second sensor transmission device, the selection command causing a first action selected from the action list to be carried out in the first sensor transmission device and a second action selected from the action list to be carried out in the at least second sensor transmission device.

10. The method as recited in claim 2, further comprising:
sending a selection command from the bus control device to a first and an at least second sensor transmission device, the selection command causing a first action selected from the action list to be carried out in the first sensor transmission device and a second action selected from the action list to be carried out in the at least second sensor transmission device.

11. A sensor transmission device, comprising:
an arrangement for obtaining payload data from a sensor, the payload data representing a physical quantity measured by the sensor;
an arrangement for ascertaining an assignment rule based on an action list, the action list containing multiple combinations in each case of one of multiple possible operating states for each sensor transmission device which uses a data bus, wherein the assignment rule represents a relation between a number of total payload data blocks of the payload data field and an instantaneous operating state of each of the sensor transmission devices;
an arrangement for ascertaining at least one of multiple different lengths and multiple different positions of a payload data block in a payload data field as a function of the assignment rule and the instantaneous operating state of a sensor transmission device, wherein the payload data field is configured to have a variable number of total payload data blocks; and
an arrangement for receiving predetermined signaling data in a signaling field of a bus data packet and, in response thereto, positioning at least a portion of the received payload data in the payload data block specified by the assignment rule for the sensor transmission device.

12. A bus control device, comprising:
an arrangement for reading in a bus data packet including at least one signaling field and a payload data field, wherein the payload data field is configured to have a variable number of total payload data blocks;
an arrangement for determining an assignment rule based on an action list, the action list containing multiple combinations in each case of one of multiple possible operating states for each sensor transmission device using a data bus, the assignment rule representing a relation between a number of total payload data blocks of a payload data field and an instantaneous operating state of each of a plurality of sensor transmission devices; and
an arrangement for interpreting a payload data of a bus data packet and assigning a read-out payload data to the different sensor transmission devices, taking into consideration that the payload data field has a different number of total payload data blocks for different combinations of the operating states of the sensor transmission devices in accordance with the assignment rule.

13. A computer program product tangibly embodied on a non-transitory computer readable storage medium, having program code for carrying out a method for assigning payload data from a bus data packet to different sensor transmission devices, a bus control device being connected to a data bus of a vehicle designed for a simultaneous transmission of bus data packets between multiple sensor transmission devices and the bus control device, the method comprising:
reading in a bus data packet including at least one signaling field and a payload data field having at least two payload data blocks, wherein the payload data field is configured to have a variable number of total payload data blocks;
determining an assignment rule based on an action list, the action list containing multiple combinations in each case of one of multiple possible operating states for each sensor transmission device using the data bus, the assignment rule representing a relation between a number of total payload data blocks of the payload data field and an instantaneous operating state of each of the sensor transmission devices; and interpreting a payload data of the bus data packet and assigning a read-out payload data to the different sensor transmission devices, taking into consideration that the payload data field has a different number of total payload data blocks for different combinations of the operating states of the sensor transmission devices in accordance with the assignment rule.

14. A computer program product tangibly embodied on a non-transitory computer readable storage medium, having program code for carrying out a method for transmitting payload data from a sensor transmission device to a bus control device using a data bus designed for a simultaneous transmission of bus data packets between multiple sensor transmission devices and the bus control device, the bus data packets including at least one signaling field and a payload data field having at least one payload data block, the method comprising:

obtaining payload data from a sensor, the payload data representing a physical quantity measured by the sensor;

ascertaining an assignment rule based on an action list, the action list containing multiple combinations in each case of one of multiple possible operating states for each sensor transmission device which uses the data bus, wherein the assignment rule represents a relation between a number of total payload data blocks of the payload data field and an instantaneous operating state of each of the sensor transmission devices;

ascertaining at least one of multiple different lengths and multiple different positions of the payload data block in the payload data field as a function of the assignment rule and the instantaneous operating state of the sensor transmission device, wherein the payload data field is configured to have a variable number of total payload data blocks; and receiving predetermined signaling data in the signaling field of the bus data packet and, in response thereto, positioning at least a portion of the received payload data in the at least one payload data block specified by the assignment rule for the sensor transmission device.

15. A method performed by a bus control device for assigning payload data from a bus data packet to different sensor transmission devices, the bus control device being connected to a data bus of a vehicle designed for a simultaneous transmission of bus data packets between multiple sensor transmission devices and the bus control device, the bus data packets including at least one signaling field and a payload data field having at least two payload data blocks, the method comprising:

reading in a bus data packet;

determining an assignment rule based on an action list, the action list containing multiple combinations in each case of one of multiple possible operating states for each sensor transmission device using the data bus, the assignment rule representing a relation between a length of the payload data field and an instantaneous operating state of each of the sensor transmission devices;

interpreting a payload data of the bus data packet and assigning a read-out payload data to the different sensor transmission devices, taking into consideration that the payload data field has different lengths for different combinations of the operating states of the sensor transmission devices in accordance with the assignment rule; and sending a selection command from the bus control device to a first and an at least second sensor transmission device, the selection command causing a first action selected from the action list to be carried out in the first sensor transmission device and a second action selected from the action list to be carried out in the at least second sensor transmission device.

16. A method performed by a bus control device for transmitting payload data from a sensor transmission device to the bus control device using a data bus designed for a simultaneous transmission of bus data packets between multiple sensor transmission devices and the bus control device, the bus data packets including at least one signaling field and a payload data field having at least one payload data block, the method comprising:

obtaining payload data from a sensor, the payload data representing a physical quantity measured by the sensor;

ascertaining an assignment rule based on an action list, the action list containing multiple combinations in each case of one of multiple possible operating states for each sensor transmission device which uses the data bus;

ascertaining at least one of multiple different lengths and multiple different positions of the payload data block in the payload data field as a function of the assignment rule and an instantaneous operating state of the sensor transmission device; and receiving predetermined signaling data in the signaling field of the bus data packet and, in response thereto, positioning at least a portion of the received payload data in the at least one payload data block specified by the assignment rule for the sensor transmission device, wherein an action selected from the action list is carried out in the sensor transmission device in the step of ascertaining the assignment rule based on the signaling data written by the bus control device into the signaling field of a bus data packet.

* * * * *